United States Patent
Ozawa et al.

(10) Patent No.: US 6,925,975 B2
(45) Date of Patent: Aug. 9, 2005

(54) CONTROLLER FOR CONTROLLING AN ELECTROMAGNETIC ACTUATOR

(75) Inventors: Hidetaka Ozawa, Saitama (JP); Kenji Abe, Saitama (JP); Yoshitomo Kouno, Saitama (JP); Minoru Nakamura, Saitama (JP); Toshihiro Yamaki, Saitama (JP); Yasuo Shimizu, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 22 days.

(21) Appl. No.: 10/068,031

(22) Filed: Feb. 6, 2002

(65) Prior Publication Data

US 2002/0104494 A1 Aug. 8, 2002

(30) Foreign Application Priority Data

Feb. 7, 2001 (JP) ....................................... 2001-030731

(51) Int. Cl.[7] ................................................ F01L 9/04
(52) U.S. Cl. ................................. 123/90.11; 123/90.24; 251/129.07; 251/129.13; 251/129.16; 251/129.18; 335/266; 335/268; 335/295
(58) Field of Search .......................... 123/90.11, 90.24, 123/90.65; 251/3, 129.07–129.18, 129.1; 335/220, 234, 257, 266–268, 277, 295; 318/161, 367, 368, 377, 474, 478, 479; 361/144, 179, 187

(56) References Cited

U.S. PATENT DOCUMENTS

| | | | | |
|---|---|---|---|---|
| 5,671,705 A | * | 9/1997 | Matsumoto et al. | 123/90.11 |
| 5,868,108 A | * | 2/1999 | Schmitz et al. | 123/90.11 |
| 5,964,192 A | * | 10/1999 | Ishii | 123/90.11 |
| 5,991,143 A | * | 11/1999 | Wright et al. | 361/187 |
| 6,003,481 A | * | 12/1999 | Pischinger et al. | 123/90.11 |
| 6,176,207 B1 | * | 1/2001 | Wright et al. | 123/90.11 |
| 6,196,172 B1 | * | 3/2001 | Cosfeld et al. | 123/90.11 |
| 6,247,432 B1 | * | 6/2001 | Pischinger et al. | 123/90.11 |
| 6,276,318 B1 | * | 8/2001 | Yanai et al. | 123/90.11 |
| 6,321,700 B1 | * | 11/2001 | Hein et al. | 123/90.11 |
| 6,340,008 B1 | * | 1/2002 | Boie et al. | 123/90.11 |
| 6,397,797 B1 | * | 6/2002 | Kolmanovsky et al. | 123/90.11 |
| 6,427,651 B1 | * | 8/2002 | Kemper et al. | 123/90.11 |
| 6,476,599 B1 | * | 11/2002 | Czimmek et al. | 324/207.16 |

FOREIGN PATENT DOCUMENTS

JP         10-274016         10/1998         ............. F01L/9/04

\* cited by examiner

*Primary Examiner*—Thomas Denion
*Assistant Examiner*—Kyle M. Riddle
(74) *Attorney, Agent, or Firm*—Lahive & Cockfield, LLP; Anthony A. Laurentano, Esq.

(57) ABSTRACT

A controller for an electromagnetic actuator comprises a pair of springs acting on opposite directions, and an armature connected to the springs. The armature is held in a neutral position given by the springs when the armature is not activated. The actuator also comprises a pair of electromagnets for driving the armature between two end positions. In response to a release of the armature held in one of the end positions, the controller applies brake to the armature according to a load condition of the armature. In high-load conditions, the valve can surely be opened without additional electric power. In low-load conditions, the armature is prevented from colliding with a yoke of the electromagnet. The application of brake includes over-excitation operation, flywheel operation and suspension of power supply. In the over-excitation operation, voltage is applied to the electromagnet corresponding to one of the end positions from which the armature is released for a first period. The first period may be determined according to a load condition of the armature. After the first period elapses, flywheel current is supplied to the electromagnet for a second period. After the second period elapses, power supply to the electromagnet is suspended. Appropriate combination of over-excitation operation, flywheel operation and suspension of power supply allows the braking force to be adjusted according to a load condition of the armature.

14 Claims, 10 Drawing Sheets

CONTROLLER FOR CONTROLLING AN ELECTROMAGNETIC ACTUATOR

BACKGROUND OF THE INVENTION

The invention relates to a controller for an electromagnetic actuator for driving a valve of an engine mounted on such apparatus as an automobile and a boat.

A valve driving mechanism having an electromagnetic actuator has been known and called a magnetic valve. An electromagnetic actuator typically includes a moving iron or an armature which is placed between a pair of springs with given off-set load so that the armature positions at an intermediate part of a pair of electromagnets. A valve is connected to the armature. When electric power is supplied to the pair of electromagnets alternately, the armature is driven reciprocally in two opposite directions thereby driving the valve. Conventionally, the driving manner is as follows.

1) The magnetic attraction power that one of the electromagnets provides to the armature overcomes rebound power by the pair of springs and attracts the armature to make it seat on a seating position. The armature (valve) is released from the seating position by such a trigger as suspension of power supply to the electromagnet, and starts to displace in a cosine function manner by the force of the pair of springs.

2) At a timing according to the displacement of the armature, an appropriate current is supplied to the other electromagnet to produce magnetic flux which generates attraction force.

3) The magnetic flux rapidly grows as the armature approaches the other electromagnet that is producing the magnetic flux. The work by the attraction power generated by the other electromagnet overcomes the sum of (i) a small work by the residual magnetic flux produced by the one electromagnet which acts on the armature to pull it back and (ii) a mechanical loss which accounts for a large portion of the sum of work. Thus, the armature is attracted and seats on the other electromagnet.

4) At an appropriate timing as the armature seats, a constant current is supplied to the other electromagnet to hold the armature in the seated state.

Application of such valve driving mechanism to intake and exhaust valves of an engine mounted on an automobile is proposed. The valve driving mechanism may not appropriately operate depending on driving conditions of an engine. When the engine is operating in a higher load condition, the exhaust valve cannot be easily opened. This is because high-pressure gas within the cylinder of the engine is applied to the valve during a period from the combustion stroke to the exhaust stroke.

More specifically, in operation of opening the valve, when the armature is released from one of the electromagnets (hereinafter, referred to as "valve-closing electromagnet") and is moving toward the other of the electromagnets (hereinafter, referred to as "valve-opening electromagnet"), energy stored in the springs is converted into mechanical work of the valve against the exhaust gas pressure. In the case where the armature is held in a neutral position given by the springs and the neutral position is located at the midpoint of the pair of electromagnets, the armature may not sufficiently approach the valve-opening electromagnet. In order to attract the armature and open the valve, it is required to apply a large amount of electric power to the valve-opening electromagnet. This means that the operation for opening the valve consumes a large amount of electric power.

One of conventionally proposed schemes for opening an exhaust valve more easily in high-load conditions is to move the neutral position of the armature of the exhaust valve slightly toward the valve-opening electromagnet beforehand. The offset of the neutral position increases the potential energy of the springs when the armature is seated on the valve-closing electromagnet. The movement of the armature when the valve-opening operation starts is accelerated. The armature sufficiently approaches the valve-opening electromagnet even if the mechanical work against the exhaust gas is done.

However, the scheme of moving the neutral position of the armature has a problem. In low-load conditions such as idling state, the gas pressure within the cylinder when the armature is released from the valve-closing electromagnet is not so strong as in high-load conditions. The mechanical work by the valve against the exhaust gas decreases. The potential energy of the springs when the valve-opening operation starts is excessive. When the armature is released in such condition, the armature may vigorously move toward the valve-opening electromagnet. Even if electric power is not supplied to the valve-opening electromagnet, the armature may collide with the yoke of the valve-opening electromagnet, thereby generating a large collision noise.

There is a need for a controller for an electromagnetic actuator in which the valve, especially the exhaust valve, is opened without additional electric power in high-load conditions and in which collision of the armature with the yoke in low-load conditions is prevented.

SUMMARY OF THE INVENTION

According to one aspect of the invention, a controller is provided for controlling an electromagnetic actuator. The actuator comprises a pair of springs acting on opposite directions and an armature connected to the springs. The armature is held in a neutral position given by the springs when the armature is not activated. The actuator includes a pair of electromagnets for driving the armature between two end positions. In response to a release of the armature held in one of the end positions, the controller applies brake to the armature in accordance with a load condition of the armature. In a high-load condition, a valve connected to the armature can surely be opened without additional electric power. In a low-load condition, the armature is prevented from colliding with a yoke of the electromagnet.

According to another aspect of the invention, the application of a brake includes over-excitation operation. The over-excitation operation includes applying, for a first period, voltage to the electromagnet corresponding to one of the end positions from which the armature is released. Adjusting the application period of voltage and the magnitude of the applied voltage allows the braking force to be adjusted easily. In one embodiment of the invention, the first period is determined according to a load condition of the armature.

According to another aspect of the invention, the application of brake includes over-excitation operation, flywheel operation and suspension of power supply. In response to a release of the armature, the over-excitation operation starts. In the over-excitation operation, voltage is applied to the electromagnet corresponding to one of the end positions from which the armature is released for a first period. After the first period elapses, flywheel current is supplied to the electromagnet for a second period. After the second period elapses, power supply to the electromagnet is suspended.

Appropriate combination of the over-excitation operation, the flywheel operation and the suspension of power supply allows the braking force to be adjusted according to a load condition of the armature. The flexibility of adjustment of the braking force is increased.

According to another aspect of the invention, a displacement of the armature is compared with a predetermined target displacement. If the armature displacement is greater than the target displacement, the first period for applying the voltage to the electromagnet is extended. If the armature displacement is less than the target displacement, the first period is shortened. Thus, the feedback control for adjusting the voltage application period according to a load condition of the armature is implemented.

According to another aspect of the invention, the armature is connected to a valve of an internal combustion engine. The braking force is adjusted according to a load condition of the valve of the engine.

DESCRIPTION OF THE PREFERRED EMBODIMENTS

Figure 1:
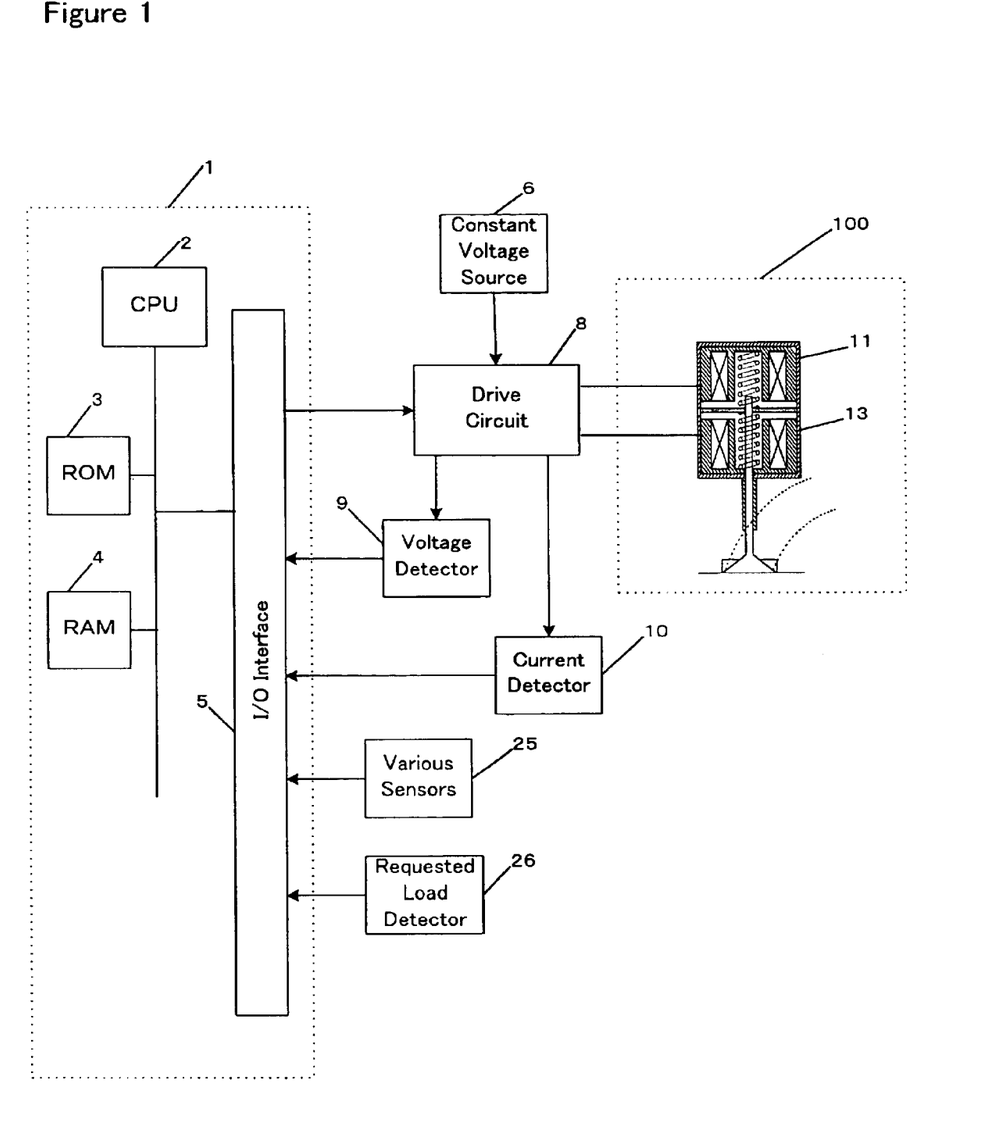
FIG. 1 is a general block diagram of a controller for an electromagnetic actuator according to one embodiment of the invention.

Referring now to the drawings, specific embodiments of the invention will be described. FIG. 1 is a block diagram showing a general structure of a controller for an electromagnetic actuator. A controller 1 comprises a microcomputer which includes a central processing unit 2 (CPU 2), a read only memory (ROM) 3 for storing computer executable programs and data, a random access memory (RAM) 4 providing a working space for the CPU 2 and storing results of operations by the CPU 2, and an input-output (I/O) interface 5.

The I/O interface 5 receives signals from various sensors 25 which include engine speed (Ne), engine water temperature (Tw), intake air temperature (Ta), battery voltage (VB), and ignition switch (IGSW). The I/O interface 5 also receives a signal indicating desired torque detected by a requested load detector 26. The detector 26 can be an accelerator pedal sensor that detects the magnitude of depression of the accelerator pedal.

A drive circuit 8 supplies electric power from a constant voltage source 6 to a first electromagnet 11 and a second electromagnet 13 of an electromagnetic actuator 100 based on a control signal from the controller 1. In one embodiment of the invention, electric power for attracting the armature is supplied as a constant voltage, and electric power for holding the armature in a seating position is supplied as a constant current. A constant current control can be carried out, for example, by pulse duration modulation of the voltage supplied from the constant voltage source 6.

A voltage detector 9 is connected to the drive circuit 8. The voltage detector 9 detects the magnitude of the voltage supplied to the first and the second electromagnets 11 and 13, and sends the results to the controller 1. A current detector 10 is connected to the drive circuit 8 and detects the magnitude of the current supplied to the first and the second electromagnets 11 and 13. The current detector 10 sends the results to the controller 1.

Based on input from the various sensors 25, input from the requested load detector 26, and input from the voltage detector 9 as well as the current detector 10, the controller 1 determines such parameters as timing of power supply, magnitude of voltage to be supplied, and voltage application period in accordance with control programs stored in the ROM 3. Then, the controller 1 sends control signals for controlling the electromagnetic actuator 100 to the drive circuit 8 over the input-output interface 5. Thus, the drive circuit 8 provides optimized current to the first and the second electromagnets 11 and 13. The current is optimized for fuel consumption, emission reduction, and output characteristics enhancement of an internal combustion engine.

Figure 2:
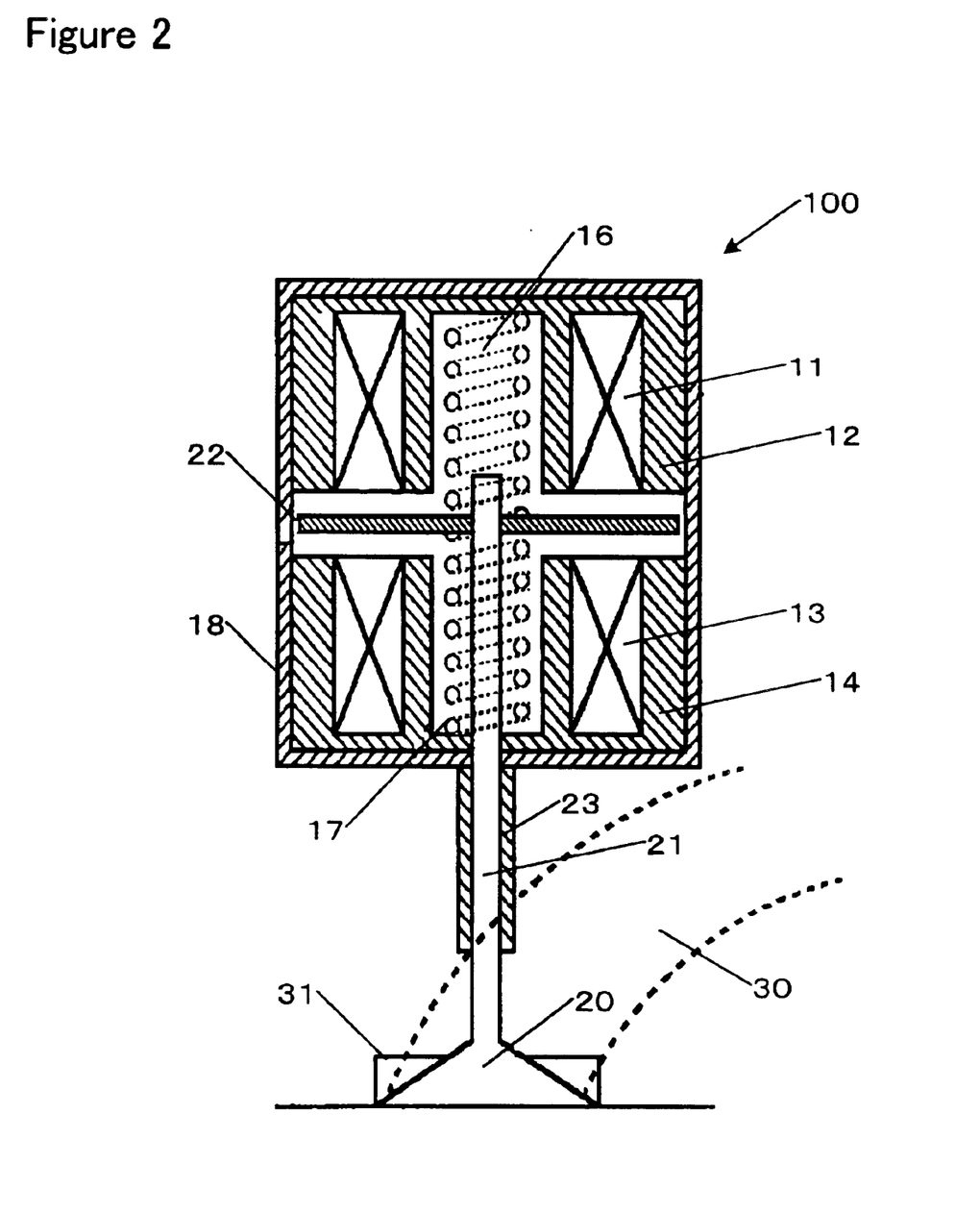
FIG. 2 shows a mechanical structure of an electromagnetic actuator according to one embodiment of the invention.

FIG. 2 is a sectional drawing which shows the structure of the electromagnetic actuator 100. A valve 20 is provided at an intake port or an exhaust port (referred to as intake/exhaust port) so as to open and close the intake/exhaust port 30. The valve 20 seats on a valve seat 31 and closes the intake/exhaust port 30 when it is driven upwardly by the electromagnetic actuator 100. The valve 20 leaves the valve seat 31 and moves down a predetermined distance from the valve seat to open the intake/exhaust port 30 when it is driven downward by the electromagnetic actuator 100.

The valve 20 extends to a valve shaft 21. The valve shaft 21 is accommodated in a valve guide 23 so that it can move in the direction of the axis. A disc-shaped armature 22 made of soft magnetic material is mounted at the upper end of the valve shaft 21. The armature 22 is biased with a first spring 16 and a second spring 17 from top and bottom.

A housing 18 of electromagnetic actuator 100 is made of nonmagnetic material. Provided in the housing 18 are a first electromagnet 11 of solenoid type placed above the armature 22, and a second electromagnet 13 of solenoid type located underneath the armature 22. The first electromagnet 11 is surrounded by a first electromagnet yoke 12, and the second electromagnet 13 is surrounded by a second electromagnet yoke 14. The first spring 16 and the second spring 17 are balanced to support the armature 22 in the middle between the first electromagnet 11 and the second electromagnet 13 when no exciting current is supplied to the first electromagnet 11 or the second electromagnet 13.

When exciting current is supplied to the first electromagnet 11 by the drive circuit 8, the first electromagnet yoke 12 and the armature 22 are magnetized to attract each other, thereby pulling up the armature 22. As a result, the valve 20 is driven upwardly by the valve shaft 21, and seats on the valve seat 31 to form a closed state.

Cutting off the current to the first electromagnet 11 and starting current supply to the second electromagnet 13 will make the second electromagnet yoke 14 and the armature 22 magnetized to produce a force which combined with the potential energy of the springs attracts the armature 22 downwardly. The armature 22 contacts the second electromagnet yoke 14 and stops there. As a result, the valve 20 is driven downwardly by the valve shaft 21 to form an open state.

The first electromagnet 11 is referred to as valve-closing electromagnet and the second electromagnet 13 is referred to as valve-opening electromagnet. Similarly, the first yoke 12 is referred to as valve-closing yoke and the second yoke 14 is referred to as valve-opening yoke.

Figure 3:
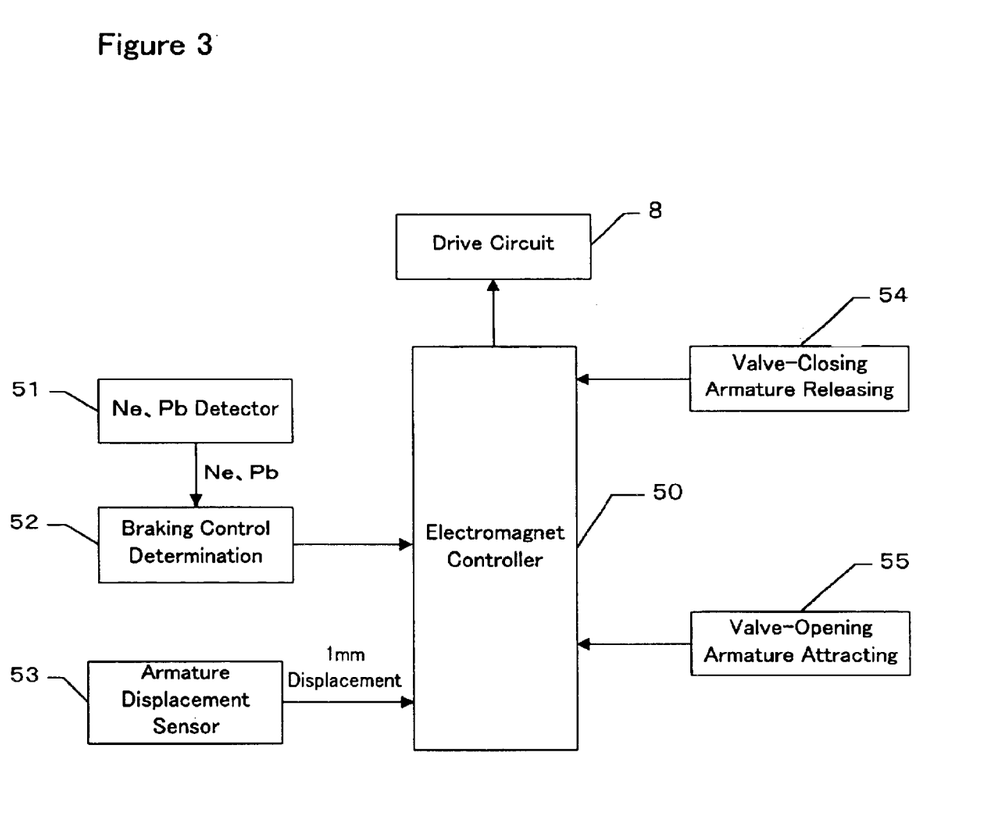
FIG. 3 is a functional block diagram of a controller for an electromagnetic actuator according to one embodiment of the invention.

FIG. 3 is a detailed functional block diagram of the electromagnetic actuator controller 1 of FIG. 1. An electromagnet controller 50 controls the drive circuit 8 so that constant voltage is applied to the electromagnet for attracting the armature. The controller 50 also controls the drive circuit 8 so that constant current is supplied to the electromagnet for holding the armature in a seating position.

A Ne, Pb detector 51 detects engine speed Ne based on outputs from an engine speed sensor, and detects inlet pipe pressure Pb based on outputs from an intake pipe pressure sensor. Pb is a parameter indicating load condition of the engine. Ne is a parameter indicative of operating speed of a valve of the engine, which corresponds to operating speed of the armature. An armature displacement sensor 53 detects a displacement of the armature.

At a scheduled time for releasing the armature, a valve-closing armature releasing unit 54 outputs a control signal to the electromagnet controller 50 for suspending the holding current supplied to the valve-closing electromagnet 11. The scheduled time for releasing the armature is determined based on such factors as valve timing and engine speed Ne. In response to the control signal, the electromagnet controller unit 50 controls the drive circuit 8 to suspend the power supply to the valve-closing electromagnet. Thus, the armature is released from the valve-closing yoke 12.

A valve-opening armature attracting unit 55 attracts the armature that has been released from the valve-closing yoke 12. More specifically, the valve-opening armature attracting unit 55 outputs a control signal to the electromagnet controller 50 when the armature reaches a predetermined position. The predetermined position is located, for example, 1 mm from the surface of the valve-opening yoke 14. In response to the control signal, the electromagnet controller 50 controls the drive circuit 8 to supply the exciting current to the valve-opening electromagnet 13 (FIG. 2).

A braking control determination unit 52 checks a load condition of the valve (armature) to determine what kind of braking operation should be applied to the armature. In this embodiment, the braking control determination unit 52 determines a load condition of the valve based on engine speed Ne and intake pipe pressure Pb from the Ne, Pb detector 51. Alternatively, the load condition of the valve may be determined based on such other parameters as opening of a throttle valve of an engine and temperature of coil of the electromagnets.

In accordance with one embodiment of the invention, three kinds of braking operations are provided. The first braking operation is to apply over-excitation voltage to the valve-closing electromagnet. The first braking operation has a function of increasing the magnetic flux or a function of not decreasing the magnetic flux. The second braking operation is to supply flywheel current to the valve-closing electromagnet. The second braking operation has a function of maintaining the magnetic flux. The third braking operation is to suspend power supply to the valve-closing electromagnet. The third braking operation has a function of decreasing the magnetic flux. The first braking operation has the largest braking force. The third braking operation has the smallest braking force. The braking force of the second braking operation is between the braking force of the first braking operation and the braking force of the third braking operation.

In accordance with one embodiment of the invention, the braking control determination unit 52, based on a load condition of the valve, determines an over-excitation period in which the first braking operation is carried out. The magnitude of braking force is adjusted by the length of the over-excitation period. In the embodiment, timing for starting the first braking operation, magnitude of voltage to be applied to the electromagnet during the first braking operation and a period in which the second braking operation is carried out are predetermined.

In another embodiment, the braking control determination unit 52 may determine any of such factors as timing for starting the first braking operation, magnitude of voltage to be applied to the electromagnet during the first braking operation and a period in which the second braking operation is carried out.

Alternatively, the magnitude of braking force during the first braking operation may be adjusted by the magnitude of voltage applied to the electromagnet.

The electromagnet controller 50 controls the drive circuit 8 so that the over-excitation operation is carried out over the over-excitation period determined by the braking control determination unit 52. After the over-excitation period has elapsed, the electromagnet controller 50 carries out the flywheel operation over a predetermined period. After the predetermined period for the flywheel operation has elapsed, the electromagnet controller 50 suspends the power supply to the valve-closing electromagnet.

Figure 4:
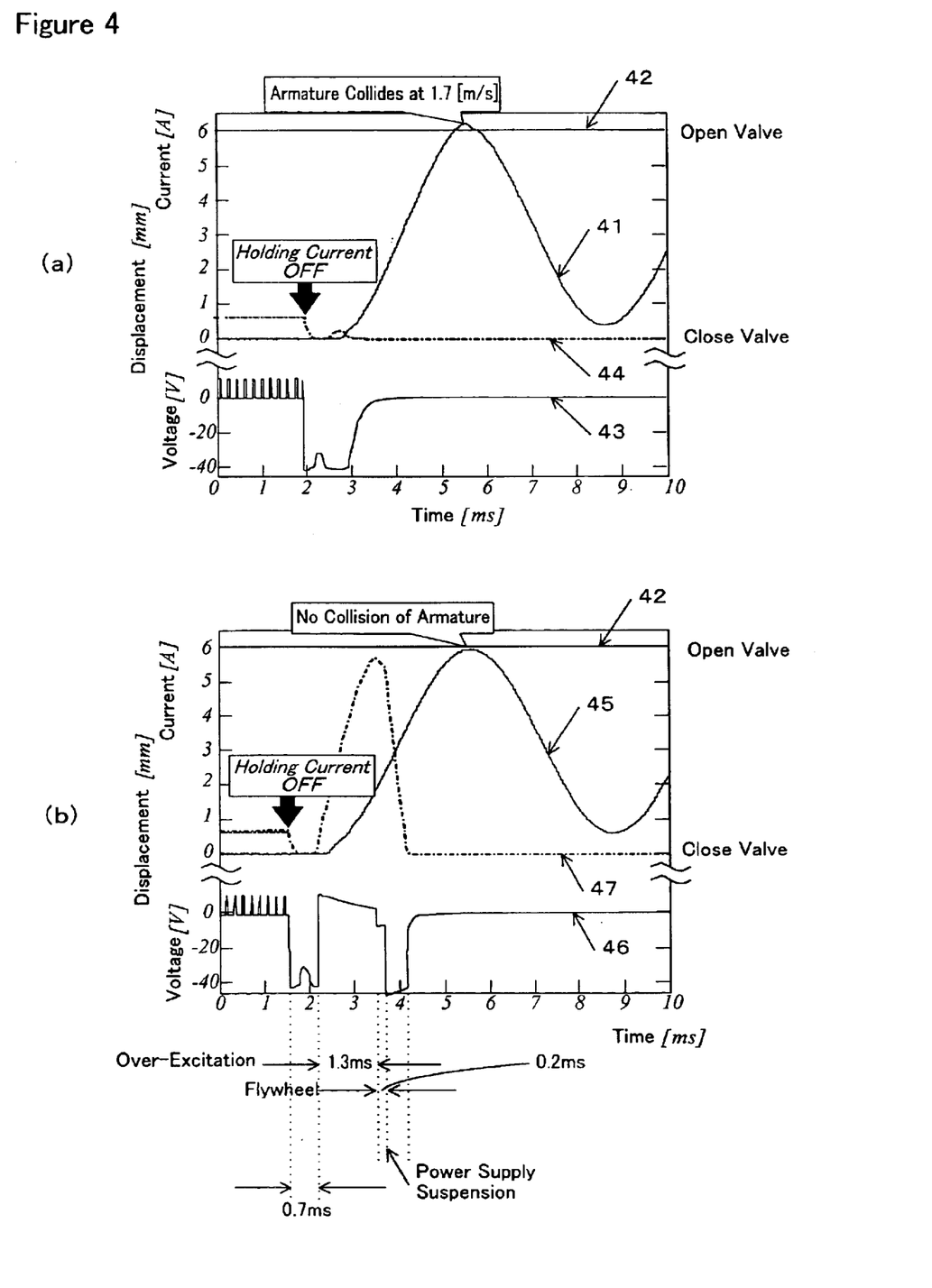
FIG. 4 shows the relationship of various parameters (a) when no braking control is performed when the armature is released, and (b) when braking control is performed after the armature is released according to one embodiment of the invention.

FIG. 4 (a) shows a case where no braking control is carried out. The left vertical axis shows the magnitude of displacement of the armature (mm). It also shows voltage (V) and current (A) of the valve-closing electromagnet.

Reference number 41 shows free vibration after the armature is released from the valve-closing yoke. Reference number 43 shows voltage of the valve-closing electromagnet, and reference number 44 shows current passing through the valve-closing electromagnet.

As shown by reference number 44, in response to suspension of holding current supplied to the valve-closing electromagnet, the armature leaves a seating position of the valve-closing yoke and collides with the valve-opening yoke indicated by a line 42. The valve and the armature are connected in such a way that the valve is pushed to the valve-closing yoke 12 by the spring 17 and the armature is pushed to the valve-opening yoke 14 by the spring 16, as shown FIG. 2. When the armature is located at the neutral position, the armature and the valve are connected by the force of the pair of springs 16 and 17, whose magnitude is typically about 300N (newton). When the armature collides with the valve-opening yoke, the valve leaves the armature and slightly passes through its seating position, as shown reference numbers 42 and 44. Then, the valve is pulled back by the force of the springs and again connected to the armature. The speed of the armature when it collides with the valve-opening yoke is 1.7 m/s, which may generate large collision noise.

FIG. 4 (*b*) shows a case where braking control in accordance with one embodiment of the invention is carried out. Reference number 45 shows free vibration of the armature after the armature is released from the valve-closing yoke. Reference number 46 shows voltage of valve-closing electromagnet, and reference number 47 shows current passing through the valve-closing electromagnet.

In response to suspension of the holding current supplied to the valve-closing electromagnet, the armature leaves a seating position of the valve-closing yoke and moves toward the valve-opening yoke. After about 0.7 ms has elapsed since the suspension of power supply, the over-excitation operation is performed over a period of about 1.3 ms. Voltage of 12V (volts) is applied to the valve-closing electromagnet in the over-excitation period. As shown by reference number 47, the current flowing through the valve-closing electromagnet increases. Accordingly, the magnetic flux produced from the electromagnet increases. Decrease of attracting force of the valve-closing electromagnet is suppressed. Thus, brake is applied to the armature moving toward the valve-opening yoke. As can be seen in comparison with the wave 41 in FIG. 4 (*a*), the rising slope of the free vibration wave 45 of the armature, which shows a variation in the displacement of the armature, is more moderate.

After the over-excitation operation has completed, the flywheel operation is carried out for a period of about 0.2 ms. The braking force on the armature weakens. After the flywheel operation has completed, the power supply to the valve-closing electromagnet is suspended. At this time, a counter-electromotive force is produced in the valve-closing electromagnet. The voltage of the electromagnet drops to around −42V, as shown by reference number 46. This is because the drive circuit is configured so that current flows into the drive circuit from the electromagnet if the counter-electromotive force produced in the electromagnet exceeds a sum of power supply in the drive circuit and voltage drops in direct-current resistors of switching elements and coils. In the example shown in FIG. 4 (*b*), a very small amount of the current flows into the drive circuit for about 0.5 ms after the power supply is suspended. Thereafter, eddy current flows within the magnet circuit so as to meet the continuity of magnetic flux, thereby causing a Joule loss. The magnetic flux rapidly decreases. Accordingly, the braking force on the armature rapidly decreases. However, the speed of the armature has been already slowed down due to the braking force applied by the over-excitation operation. Thus, the armature can continue free vibration without colliding with the valve-opening yoke, as shown by reference number 45.

It is possible to adjust the braking force on the armature by means of appropriate combination of three braking operations of over-excitation, flywheel, and power supply suspension. In one embodiment in accordance with the invention, when the valve can be easily opened in low-load conditions, the over-excitation period is extended by a predetermined time. When the valve cannot be easily opened in high-load conditions, the over-excitation operation is shortened by a predetermined time.

The period for the flywheel operation can be predetermined. Alternatively, the flywheel period may be set shorter when the over-excitation period is set longer. The flywheel period may be set longer when the over-excitation period is set shorter.

In another embodiment of the invention, the timing for applying voltage in the over-excitation operation may be set according to a load condition of the valve. For example, the voltage application timing is set earlier in low-load conditions so that braking force is applied earlier to the armature.

In another embodiment of the invention, any appropriate magnitude of voltage to be applied may be determined according to a load condition of the valve. For example, in low-load conditions, larger voltage is applied so as to enhance the braking force.

In another embodiment of the invention, the flywheel operation is not performed. Only the over-excitation operation is carried out so as to appropriately generate the braking force. In this case, after the over-excitation operation has completed, power supply to the valve-closing electromagnet is suspended. In comparison with the case where the flywheel operation is carried out, the magnetic flux generated from the valve-closing electromagnet decreases more rapidly after the over-excitation operation has completed. Accordingly, the braking force weakens quickly. However, if sufficient braking force is applied to the armature in the over-excitation operation, the armature continues its free vibration without colliding with the valve-opening yoke.

In another embodiment of the invention, the voltage to be applied during the over-excitation operation may be changed during the over-excitation period. For example, voltage of 42V is applied in the earlier stage of the over-excitation period. The applied voltage is changed to 12V after a given period has elapsed. With such voltage adjustment, the braking force is stronger in the earlier stage, and then weakens. Thus, the braking force can be adjusted to prevent the armature from colliding with the valve-opening yoke.

Figure 5:
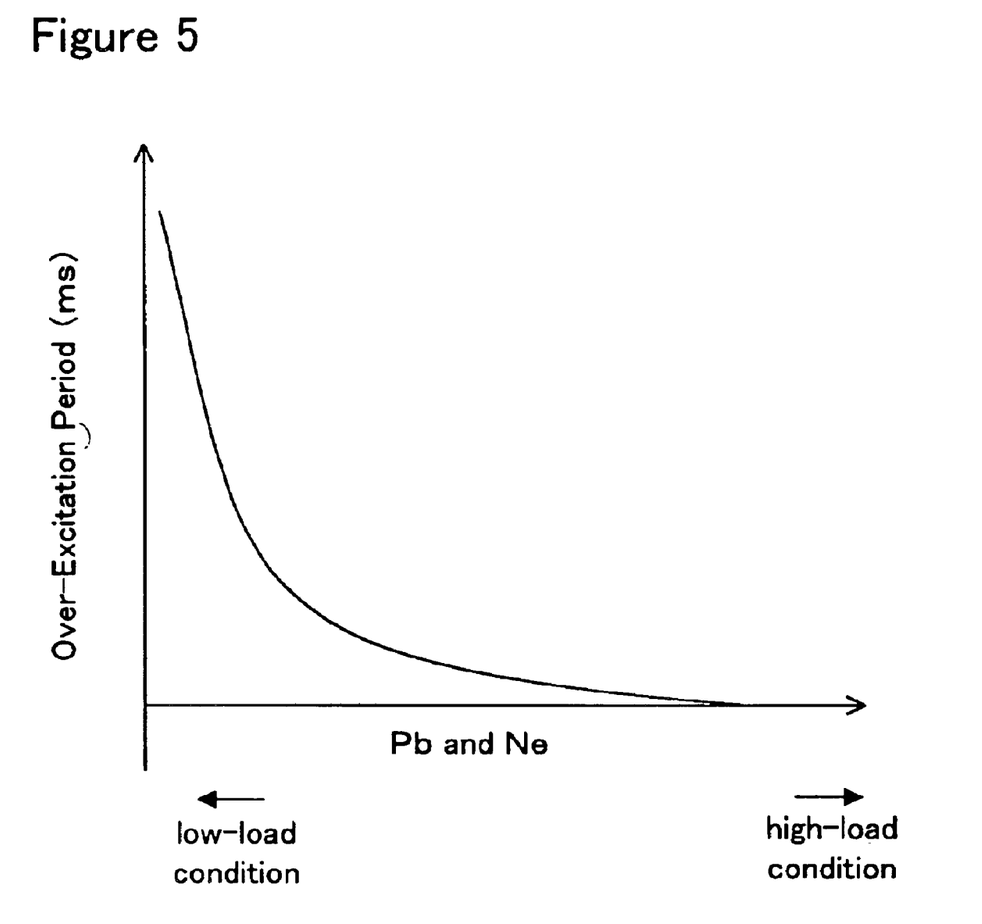
FIG. 5 shows a schematic example of a braking control map according to one embodiment of the invention.

FIG. 5 schematically shows an example of a braking control map according to one embodiment of the invention. The horizontal axis indicates a load condition of the valve, where the load condition becomes higher toward the right direction. In this embodiment, the load condition is represented by engine speed Ne and intake pipe pressure Pb. The vertical axis shows the over-excitation period. As can be seen in the map, the over-excitation period shortens as the load increases. This is because the valve cannot be easily opened in higher load conditions. In higher load conditions, strong braking force is not required. In lower load conditions, because the valve can be relatively easily opened, stronger braking force is required so as to weaken the movement of the armature.

In accordance with the map, the over-excitation period becomes zero when the load exceeds a predetermined level. In higher load conditions than the predetermined level, there is no possibility of collision of the armature with the valve-opening yoke even if no braking force is applied to the armature.

Figure 6:
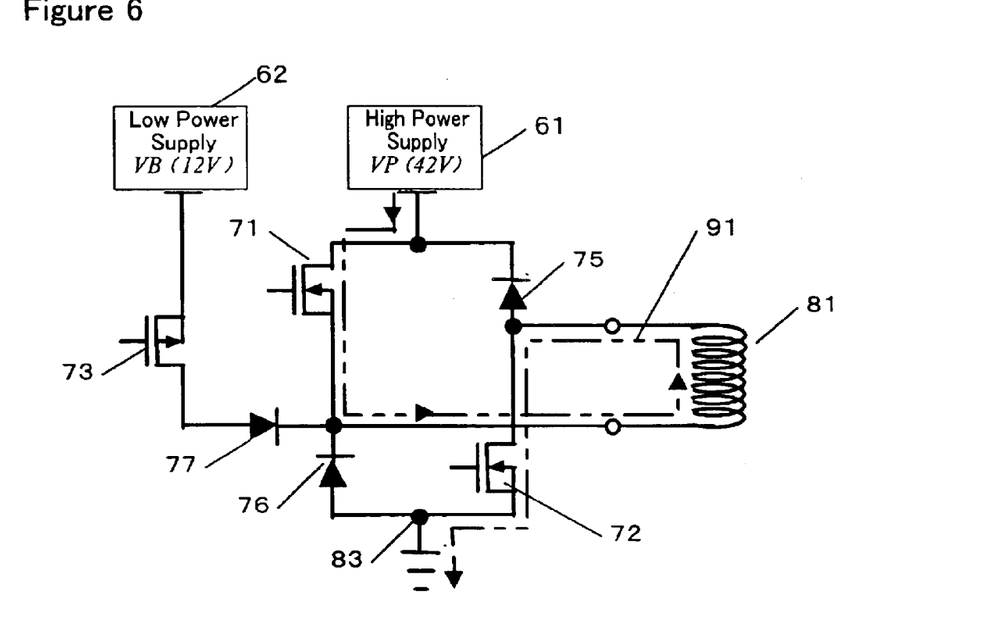
FIG. 6 is a schematic circuit showing current paths in an over-excitation operation according to one embodiment of the invention.
Figure 7:
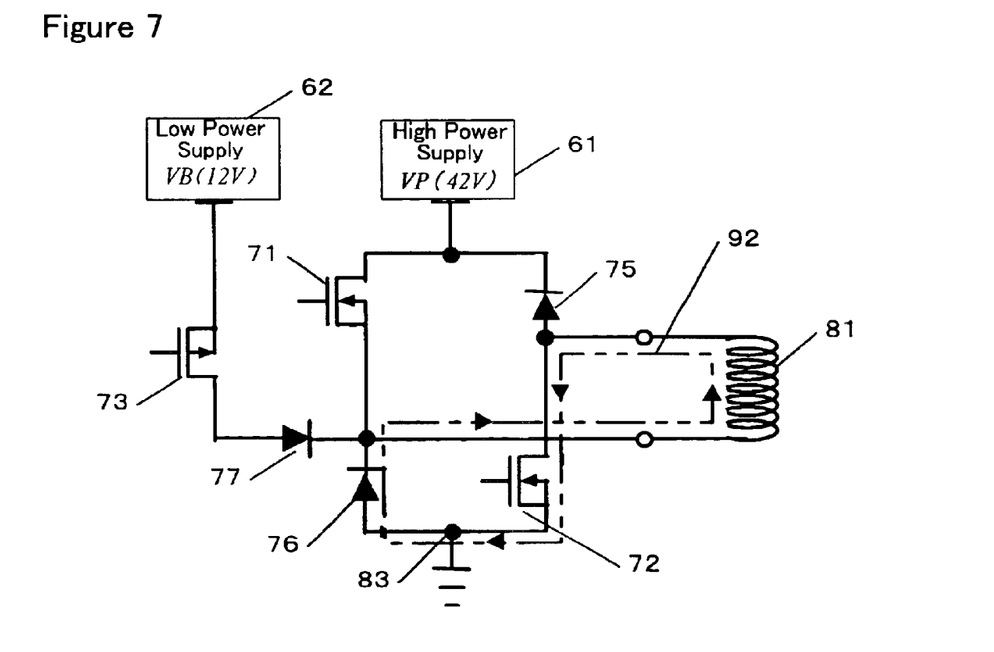
FIG. 7 is a schematic circuit showing current paths in a flywheel operation according to one embodiment of the invention.
Figure 8:
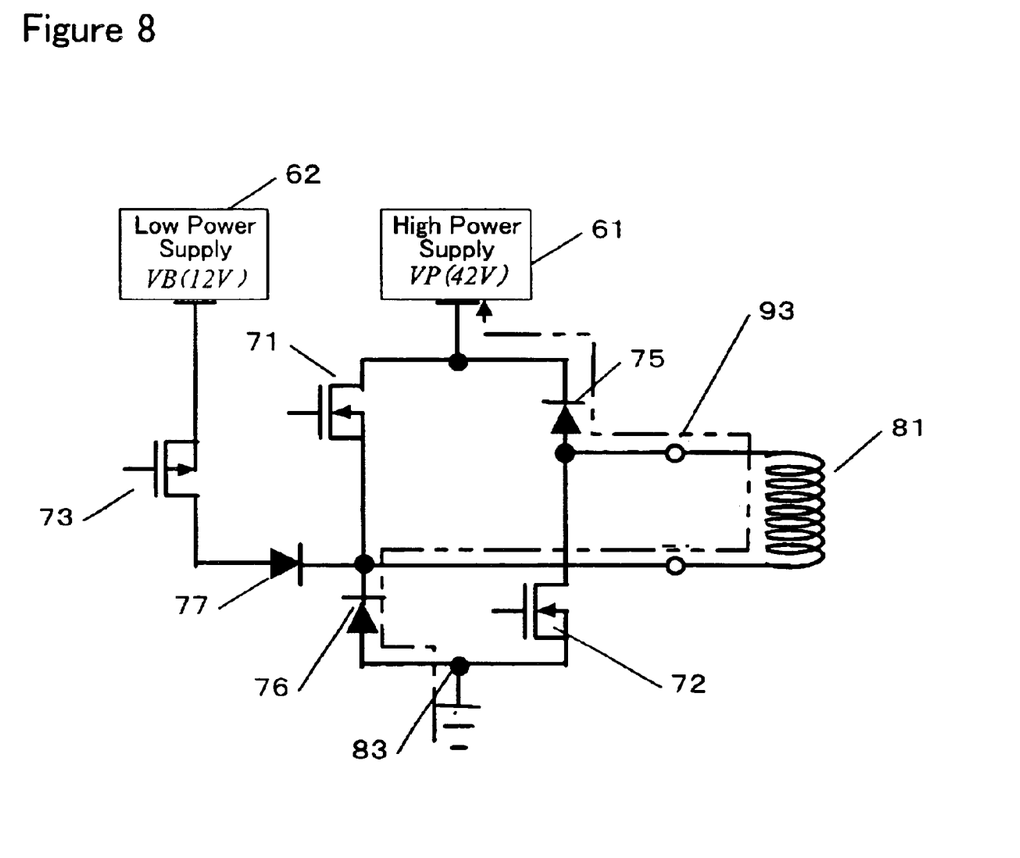
FIG. 8 is a schematic circuit showing current paths after power supply is suspended according to one embodiment of the invention.

Referring to FIG. 6 through FIG. 8, current paths in the drive circuit for the respective braking operations will be described. FIG. 6 schematically shows a drive circuit for the valve-closing electromagnet 81. A power supply 61 is a source for high voltage of 42V to be used for a constant voltage control for attracting the armature. A power supply 62 is a source for low voltage of 12V to be used for a constant voltage control for holding the armature.

The drive circuit comprises the valve-closing electromagnet 81, a first FET 71, a second FET 72, a third FET 73, a first diode 75, a second diode 76 and a third diode 77. The first FET 71 is a switching means implemented by an N-channel FET, whose source terminal is connected to the electromagnet 81, drain terminal is connected to the power supply 61 and gate terminal is connected to a current control circuit (not shown). The second FET 72 is a switching means implemented by an N-channel FET, whose source terminal is connected to a grounding terminal 83, drain terminal is connected to the electromagnet 81 and gate terminal is connected to the current control circuit. The current control circuit controls a timing of power supply to the electromagnet 81 based on a control signal from the controller 1 shown in FIG. 1.

The third FET 73 is a switching means implemented by a P-channel FET, whose drain terminal is connected to the electromagnet 81 via the third diode 77, source terminal is connected to the power supply 62 and gate terminal is connected to the current control circuit.

Alternatively P-channel FETs may be used for the first and second FETs 71 and 72. An N-channel FET may be used for the third FET 73. Furthermore, any appropriate switching elements such as power transistor and IGBT (isolated gate bipolar transistor) may be used instead of FETs 71–73.

The first diode 75 is provided so that its anode terminal is connected to the electromagnet 81 and its cathode terminal is connected to the power supply 61. The second diode 76 is provided so that its anode terminal is connected to the grounding terminal 83 and its cathode terminal is connected to the electromagnet 81. The third diode 77 is provided so that its anode terminal is connected to the power supply 62 via the third FET 73 and its cathode terminal is connected to the electromagnet 81.

The over-excitation operation will be described. The controller 1 (FIG. 1) outputs a control signal to the current control circuit to carry out a valve-opening operation. In response to the control signal, the current control circuit outputs a control signal at a timing of starting the over-excitation operation so as to turn the first FET 71 and the second FET 72 on. The third FET 73 is in the off state. Thus, a current path is formed as shown in a path 91. Voltage of 42V from the power supply 61 is applied to the electromagnet 81. As the voltage of 42V is continuously applied to the electromagnet 81, the magnetic flux generated from the electromagnet 81 increases. Thus, the magnitude of attractive force for attracting the armature increases.

Referring to FIG. 7, the flywheel operation will be described. FIG. 7 shows the same drive circuit as shown in FIG. 6. The first FET 71 is turned off in response to a control signal from the current control circuit. The second FET 72 is kept in the on state. Since the first FET 71 is turned off, the application of voltage to the electromagnet 81 is stopped. Counter-electromotive force is induced in the electromagnet 81, generating a high voltage on its negative side (the first diode 75 side). The electromagnet 81 tends to continue passing the current in the same direction as when the voltage was applied.

Meanwhile, because the first FET 71 is switched off, a closed circuit is formed from the negative side of the electromagnet 81, through the second FET 72 and the second diode 76, to the positive side (the second FET 72 side) of the electromagnet 81. The high voltage on the negative side of the electromagnet 81 is discharged as flywheel current passing through the closed circuit as shown by a path 92.

Since the magnetic energy that has been charged in the electromagnet 81 flows through the closed circuit as flywheel current, the magnetic flux from the electromagnet 81 is almost maintained. Thus, the armature is attracted during the flywheel operation by attraction force that is almost the same as the over-excitation operation.

Referring to FIG. 8, suspension of power supply will be described. FIG. 8 shows the same drive circuit as shown in FIG. 6 and FIG. 7. The second FET 72 is turned off in response to a control signal from the current control circuit. The first FET 71 is kept in the off state. As shown by a path 93, there is formed a current path that runs through the second diode 76, the electromagnet 81 and the first diode 75. The magnetic energy that has been charged in the electromagnet 81 is returned to the power supply 61 through the first diode 75. Thus, when the power supply is suspended, a small current flows through the electromagnet 81. The magnetic flux generated from the electromagnet 81 rapidly decreases. Accordingly, attractive force for attracting the armature quickly weakens.

Figure 9:
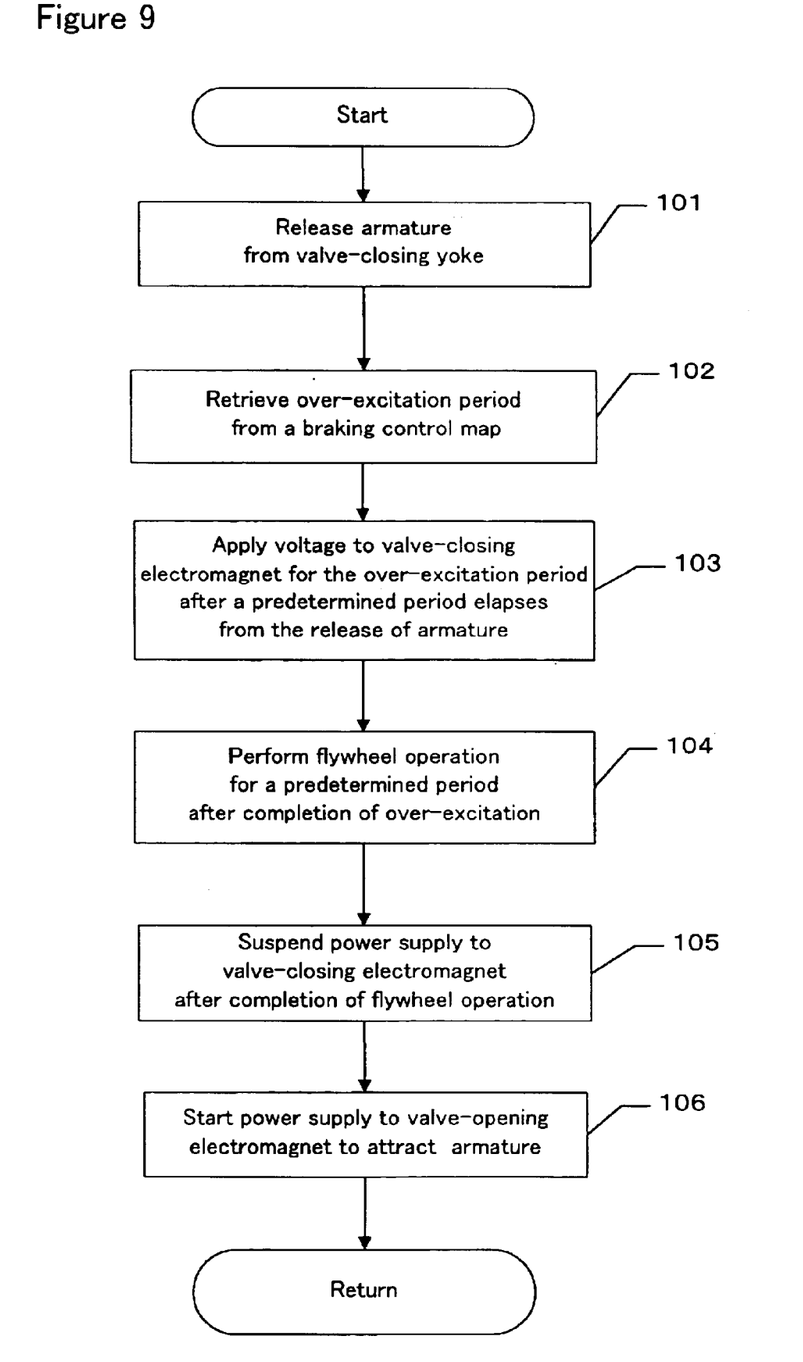
FIG. 9 is a flowchart showing braking operations according to one embodiment of the invention.

FIG. 9 is a flowchart showing the process for performing the braking operations. In step 101, the armature, which has been held on the valve-closing yoke, is released. The release is activated by means of suspension of holding current that has been supplied to the valve-closing electromagnet. In step 102, the over-excitation period is retrieved from the braking control map based on present Pb and Ne detected by the Pb and Ne sensors. In step 103, the over-excitation operation starts after a predetermined period (0.7 ms in the example shown in FIG. 4(b)) has elapsed from the start time of the armature release. The over-excitation operation is carried out over the over-excitation period retrieved in step 102. After the over-excitation period has elapsed, the flywheel operation is carried out for a predetermined period (for example, 0.2 ms in the example shown in FIG. 4(b)) in step 104. Then, power supply to the valve-closing electromagnet is suspended in step 105. After the suspension of the power supply, electric power is supplied to the valve-opening electromagnet at a predetermined timing so as to attract the armature in step 106. The armature is moved toward the valve-opening yoke and the valve is opened.

Figure 10:
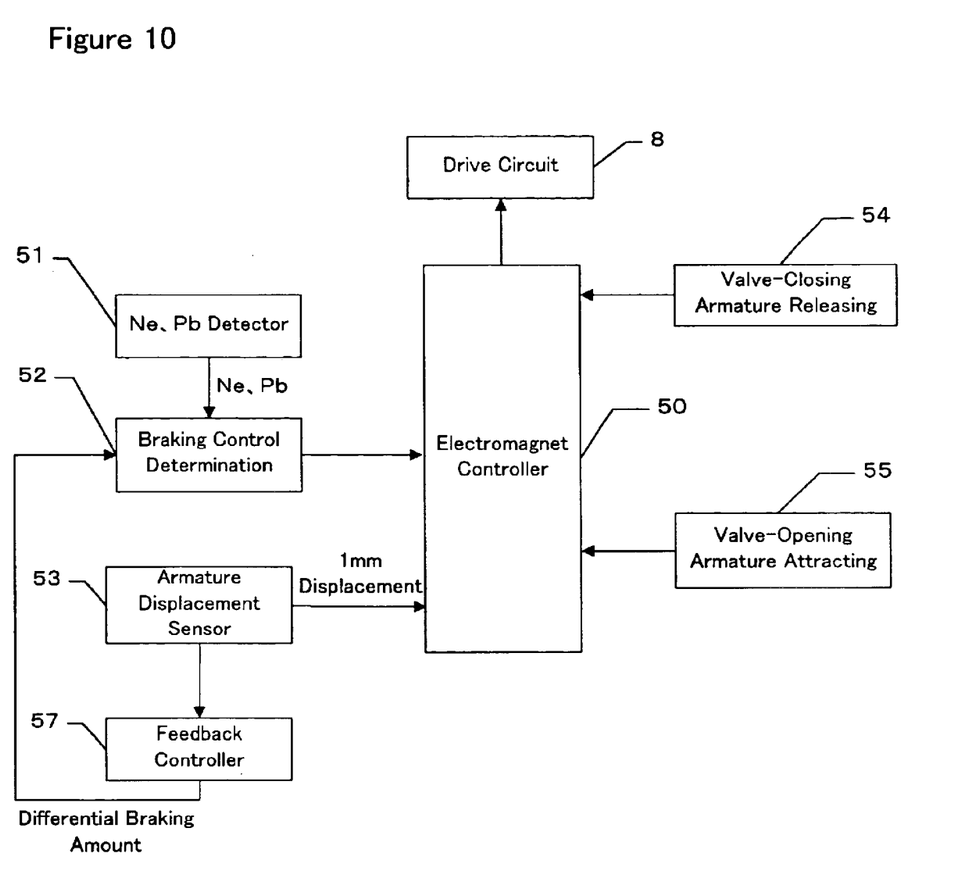
FIG. 10 is a functional block diagram of a controller for an electromagnetic actuator according to another embodiment of the invention.

FIG. 10 is a functional block diagram of a controller for an electromagnetic actuator according to a second embodiment of the invention. The same reference numerals with FIG. 3 are used for corresponding blocks and description on such blocks is not repeated.

In the current cycle for releasing the armature, a feedback controller 57 compares the armature displacement detected by the armature displacement sensor 53 with a predetermined target displacement after a predetermined period has elapsed since the activation of the release operation of the armature. The feedback controller 57 calculates a differential braking amount based on a difference between the detected displacement and the target displacement. The differential braking amount indicates a deviation from the amount of braking in the current cycle. In the embodiment, the amount of braking is represented by the length of the over-excitation period.

More specifically, if the detected displacement is greater than the target displacement, it means that stronger braking force needs to be applied to the armature. The differential braking amount to be added to the amount of braking of the current cycle is calculated. In other words, it is determined how much the over-excitation period is extended. The determined extension period is added to the over-excitation period of the current cycle. In the next cycle, the over-excitation operation is carried out over the calculated over-excitation period.

If the detected displacement is less than the target displacement, it means that smaller braking force needs to be applied to the armature. The differential braking amount to be subtracted from the amount of braking of the current cycle is calculated. In other words, it is determined how much the over-excitation period is shortened. The determined shortening period is subtracted from the over-excitation period of the current cycle. In the next cycle, the over-excitation operation is carried out over the calculated over-excitation period.

If the detected displacement is equal to the target displacement, it means that appropriate over-excitation period is already used. The differential braking amount is set to zero.

Thus, through the feedback control of the differential braking amount, the amount of braking for each valve can be adjusted. The target displacement is predetermined in such a way that the armature can freely move without colliding with the valve-opening yoke.

In another embodiment, the differential braking amount may be predefined as a constant value. For example, if the armature displacement is greater than the target displacement when a given period has elapsed since the activation of release operation of the armature, the over-excitation period is extended by 0.2 ms. If the armature displacement is less than the target displacement, the over-excitation period is shortened by 0.2 ms.

In another embodiment, the braking control map may be updated with the differential braking amount determined in the feedback control. In a yet further embodiment, the feedback control may be implemented so that speed of the armature when it reaches the valve-opening yoke is adjusted to an appropriate value. For example, if the armature speed is too fast, the over-excitation period is extended. If the armature speed is slow, the over-excitation period is shortened.

In another embodiment, the differential braking amount may be represented by the magnitude of voltage applied to the electromagnet. For example, if the armature displacement is greater than the target displacement when a given period has elapsed since the activation of release operation of the armature, the applied voltage is increased. If the armature displacement is less than the target displacement, the applied voltage is reduced.

The braking control determination unit 52 receives the differential braking amount, namely the differential over-excitation time that is calculated by the feedback controller 57. The braking control determination unit 52 adds the differential over-excitation time determined during the previous cycle to the over-excitation period that is retrieved from the braking control map based on present Ne and Pb so as to determine the over-excitation period for the current cycle.

Figure 11:
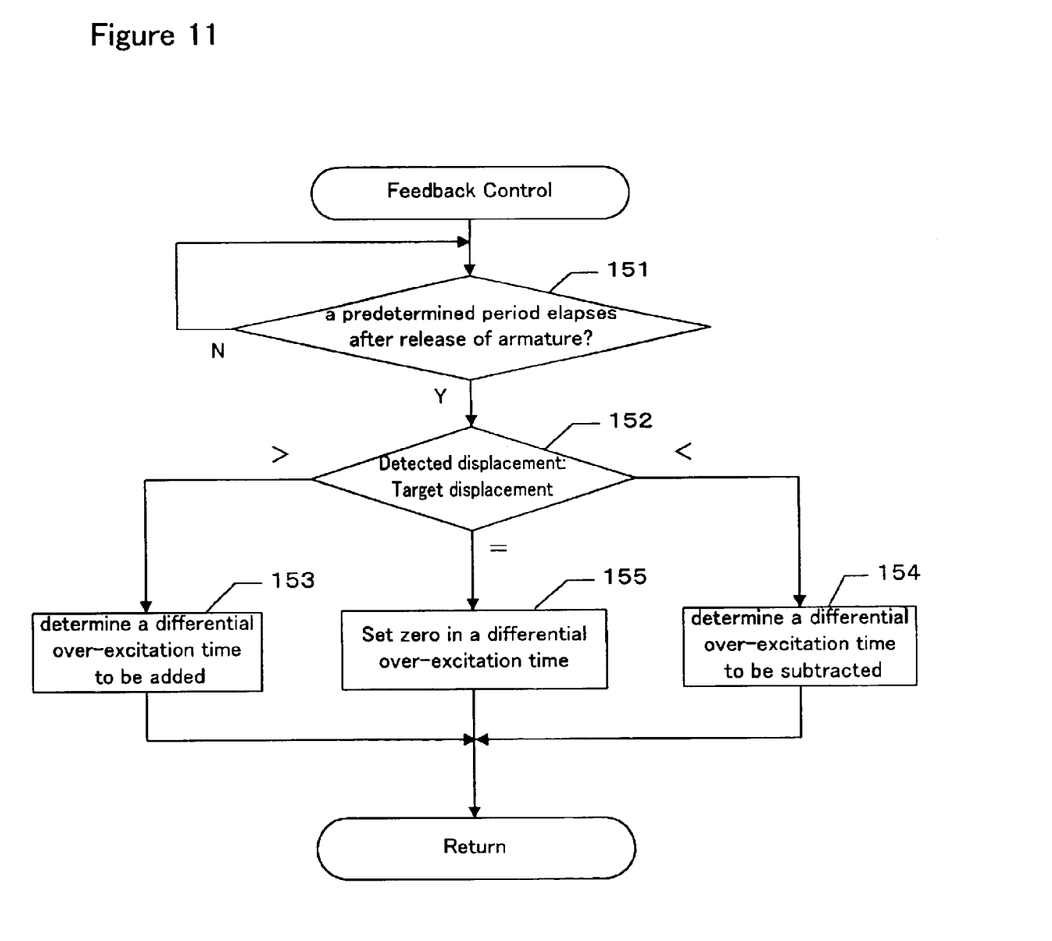
FIG. 11 is a flowchart showing feedback control according to another embodiment of the invention.

FIG. 11 is a flowchart showing the process of the feedback control according to a second embodiment of the invention. The feedback control can be performed in parallel with the process of the braking operations shown in FIG. 9 after the armature is released from the valve-closing yoke.

In step 151, it is determined whether a timer, which is started upon the activation of release operation of the armature, exceeds a predetermined period. When the predetermined period elapses, the displacement of the armature is detected. The detected displacement and a predetermined target displacement are compared (step 152). If the detected displacement is greater than the target displacement, it means that the armature movement is too fast. A differential over-excitation time to be added to the present over-excitation period is determined (step 153). If the armature displacement is less than the target displacement, it means that the armature movement is too slow. A differential over-excitation time to be subtracted from the present over-excitation period is determined (step 154). If the armature displacement is equal to the target displacement, the differential over-excitation time is set to zero (step 155). Thus, the feedback control is performed so as to make the armature displacement equal to the target displacement.

It will be appreciated by those skilled in the art that the above embodiments are similarly applied to an operation for closing the valve. The braking operations can be applied to the armature released from the valve-opening yoke.

While the invention has been described with respect to specific embodiments, such embodiments are not intended to limit the scope of the invention.

What is claimed is:

1. A controller for controlling an electromagnetic actuator having a pair of springs acting on opposite directions, an armature connected to the springs to be held in a neutral position given by the springs when the armature is not activated, and a pair of electromagnets for driving the armature between two end positions;

the controller configured to apply, in response to a release of the armature held in one of the end positions, a brake to the armature according to a load condition of the armature, wherein the application of the brake includes:

in response to a release of the armature, applying a voltage to the electromagnet corresponding to one of the end positions from which the armature is released for a first period;

supplying a flywheel current to the electromagnet for a second period after the first period elapses; and suspending the power supply to the electromagnet after the second period elapses.

2. The controller according to claim 1, wherein the first period is determined according to a load condition of the armature.

3. The controller according to claim 1, wherein the controller is further configured to:

compare a displacement of the armature with a predetermined target displacement;

if the armature displacement is greater than the target displacement, extend the first period for applying the voltage; and if the armature displacement is less than the target displacement, shorten the first period for applying the voltage.

4. The controller according to claim 1, wherein the armature is connected to a valve of an internal combustion engine.

5. The controller according to claim 4, wherein the valve of the internal combustion engine is an exhaust valve.

6. A program executable by a computer for controlling an electromagnetic actuator having a pair of springs acting on opposite directions, an armature connected to the springs to be held in a neutral position given by the springs when the armature is not activated, and a pair of electromagnets for driving the armature between two end positions, the program being structured to:

apply, in response to a release of the armature held in one of the end positions, a brake to the armature according to a load condition of the armature, wherein the application of the brake includes:

in response to a release of the armature, applying a voltage to the electromagnet corresponding to one of the end positions from which the armature is released for a first period;

supplying a flywheel current to the electromagnet for a second period after the first period elapses; and suspending the power supply to the electromagnet after the second period elapses.

7. The program according to claim 6, wherein the first period is determined according to a load condition of the armature.

8. The program according to claim 6, wherein the program is further structured to:

compare a displacement of the armature with a predetermined target displacement;

if the armature displacement is greater than the target displacement, extend the first period for applying the voltage; and if the armature displacement is less than the target displacement, shorten the first period for applying the voltage.

9. The program according to claim 6, wherein the armature is connected to a valve of an internal combustion engine.

10. The program according to claim 9, wherein the valve of the internal combustion engine is an exhaust valve.

11. A method for controlling an electromagnetic actuator having a pair of springs acting on opposite directions, an armature connected to the springs to be held in a neutral position given by the springs when the armature is not activated, and a pair of electromagnets for driving the armature between two end positions, comprising:

applying, in response to a release of the armature held in one of the end positions, a brake to the armature according to a load condition of the armature, wherein applying the brake includes:

in response to a release of the armature, applying a voltage to the electromagnet corresponding to the end position from which the armature is released for a first period;

supplying a fly-wheel current to the electromagnet for a second period after the first period elapses; and suspending the power supply to the electromagnet after the second period elapses.

12. The method according to claim 11, wherein the first period is determined according to a load condition of the armature.

13. The method according to claim 11, further comprising:

comparing a displacement of the armature with a predetermined target displacement;

if the armature displacement is greater than the target displacement, extending the first period for applying the voltage; and if the armature displacement is less than the target displacement, shortening the first period for applying the voltage.

14. The method according to claim 11, wherein the armature is connected to a valve of an internal combustion engine.

* * * * *